US006802195B1

(12) United States Patent
Quint

(10) Patent No.: US 6,802,195 B1
(45) Date of Patent: Oct. 12, 2004

(54) ISOSTATIC PRESS AND PROCESS OF USING SAME

(75) Inventor: Marc Quint, Fairview, PA (US)

(73) Assignee: Snap-tite Technologies, Inc., Wilmington, DE (US)

( * ) Notice: Subject to any disclaimer, the term of this patent is extended or adjusted under 35 U.S.C. 154(b) by 0 days.

(21) Appl. No.: 10/425,102

(22) Filed: Apr. 28, 2003

(51) Int. Cl.[7] ........................ B21D 26/04; B21C 35/00; B23P 19/00

(52) U.S. Cl. ............................ 72/56; 72/54; 425/405.2; 425/86; 29/428

(58) Field of Search .......................... 72/54, 56, 57–63; 425/86, 405.2; 29/428

(56) References Cited

U.S. PATENT DOCUMENTS 3,677,674 A 7/1972 Bowles
3,698,843 A 10/1972 Bowles et al.
3,867,077 A 2/1975 Deprez
3,882,589 A * 5/1975 Bowles ........................ 29/428
3,969,916 A 7/1976 Wiberg
3,992,912 A 11/1976 Jonsson
4,063,941 A 12/1977 Papen
4,491,302 A 1/1985 Asari et al.
4,563,143 A 1/1986 Pettersson
4,629,412 A 12/1986 Inoue et al.
4,720,256 A 1/1988 Asari et al.
4,756,680 A 7/1988 Ishii
5,118,289 A 6/1992 Bergman et al.
5,857,368 A * 1/1999 Grunes et al. ................. 72/54
6,533,997 B1 3/2003 Bergman

OTHER PUBLICATIONS

Pressure Technology, Inc., www.pressuretechnology.com "What's New at Pressure Technology", Mar. 29, 2003, 2 pgs.
Pressure Technology, Inc., www.pressuretechnology.com, "The Hot Isostatic Pressing Advantage", Mar. 29, 2003, 2pgs.
Hot Isostatic Pressing, www.kinzoku.co.jp, Mar. 29, 2003, 5 pages.
EPSI–Cold Isostatic Presses www.epsi–highpressure.com, Mar. 29, 2003, 1 pg.
EPSI–Hot Isostatic Presses, www.epsi–highpressure.com, Mar. 29, 2003, 1 pg.
IsoHipper, Autoclave Engineers, Bulletin 48310, Published circa 1985–1986.

* cited by examiner

*Primary Examiner*—David Jones
(74) *Attorney, Agent, or Firm*—Woodling, Krost and Rust

(57) ABSTRACT

An isostatic press and the process of using same is disclosed and claimed. The isostatic press includes a yoke; a bottom cover affixed to the yoke; a top cover affixed to the yoke; and, a body moveable between a first position and a second position. A process for isostatically pressing a workpiece in the isostatic press is also disclosed and claimed. The process includes the steps of: placing the workpiece on the bottom cover; moving the body from the first position to the second position; pressurizing the chamber; depressurizing the chamber; removing the workpiece; and, moving the chamber from the second position to the first position.

23 Claims, 10 Drawing Sheets

Fig. 1 (Prior Art)
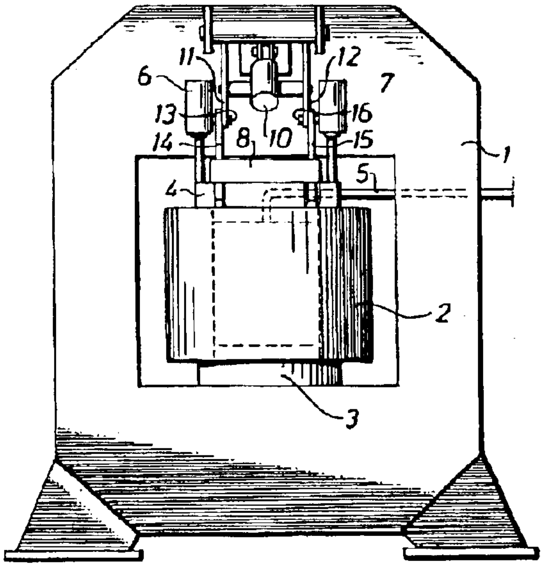
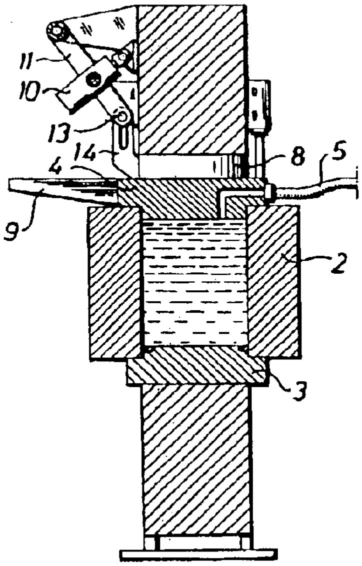
Fig. 2
(Prior Art)
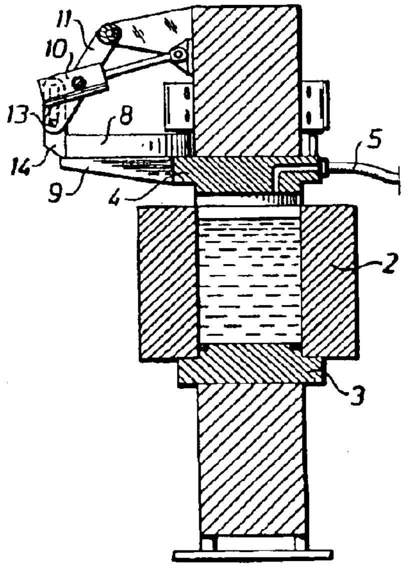
Fig. 3
(Prior Art)

ISOSTATIC PRESS AND PROCESS OF USING SAME

FIELD OF THE INVENTION

The invention is in the field of isostatic presses and the process of using same.

BACKGROUND OF THE INVENTION

U.S. Pat. No. 3,992,912 to Jonsson issued on Nov. 23, 1976 and discloses an isostatic press in which workpieces are enclosed in a pressure vessel filled with a liquid and closed by a lid. The vessel is pressurized after it is placed in a frame adapted to absorb substantially vertical forces. The lid or top cover is moveable substantially vertically in relation to the pressure vessel after the vessel has been introduced into the frame.

The '912 patent to Jonsson describes known isostatic presses and states that they fall into two general categories. The first category involves small diameter pressure vessels having lids which can be screwed into the pressure vessel. The other category is applicable to larger pressure vessels where the lids must be held in place or supported by another structure such as a yoke or frame. Typically a yoke or frame can be used for the additional support which is required. The yoke or frame is typically made out of high strength metal which can resist substantial tensile forces without significant deformation. Use of the yoke or frame, however, requires that the pressure vessel be removed from the yoke or frame each time a new workpiece is to be introduced to the vessel. Efficiency in loading and unloading the pressure vessel is lowered because of the need to remove the pressure vessel from the frame. Further, process connections to the pressure vessel must be disconnected every time the vessel is loaded and unloaded. These process connections must be secure as the pressure in the isostatic pressure vessels can reach 150,000 psi. Every time a process connection is made and broken, the seal therein is slightly degraded.

The '912 patent to Jonsson discloses a frame and a pressure vessel within the frame. Although the pressure vessel is moved horizontally every cycle, the lid is moved substantially vertically by two cylinders 6, 7. See, FIG. 1. The press shown in the drawing comprises a frame stand 1 into which a cylindrical high-pressure vessel 2 is introduced. The pressure vessel 2 is provided with a bottom closure 3 and a top lid 4. A pressure fluid pipe 5 communicates with the top lid 4, which is vertically moveable by two double-acting cylinders 6, 7 disposed on each side of the frame. Spacer plate 8 is inserted into the frame 2 between the top lid 4 and the upper portion of the frame and is laterally displaceable along a track 9 as illustrated in FIGS. 2 and 3 which also illustrate the prior art. Spacer plate 8 is displaced by a hydraulic cylinder 10 actuating two lever arms 11, 12, respectively, the outer ends of which include pins 13 and 16, respectively. The pins cooperate with grooves formed in panels 14 and 15, respectively, projecting from the plate.

The '912 patent to Jonsson discloses an alternative embodiment where the top lid is fixed in relation to the upper yoke or frame and the pressure vessel is lifted toward the fixed top lid every cycle. In the alternative embodiment, the pressure vessel must be horizontally moved out of the frame each cycle for loading and unloading. Spacer plates are used in the alternative embodiment as well except they are placed underneath the pressure vessel and reside between the bottom closure of the vessel and the lower yoke of the frame.

U.S. Pat. No. 4,563,143 to Pettersson issued Jan. 7, 1986 discloses a pressure vessel or chamber 1 affixed to the top portion of a yoke or frame. A die and a closure are raised through a combination of pistons and are secured in place by pivoting legs which are also piston operated. The die/closure is brought into the isostatic press horizontally by a conveyor.

Considerable motion is necessary to place workpieces in prior art isostatic presses. Some isostatic presses involve the use of a rail 402 as illustrated in FIG. 4 to move a top portion 401 of the yoke or frame away from the pressure vessel. FIG. 4 is a diagrammatic representation of a large prior art isostatic press. An example of a large isostatic press is illustrated at http://www.kinzoku.co.jp/hot_.html. Pistons mounted on the yoke or frame 401 are used to vertically lift the top cover 404 or lid from the isostatic press and then guide the top half of the yoke 401 horizontally away from the pressure vessel thus enabling access to the pressure vessel. Hydraulic pistons and the like 405 may be used in regard to moving and securing the lid.

Referring to FIG. 4, two motions are necessary to remove the lid from the pressure vessel. First, the lid must be lifted vertically. Next, the lid must be moved horizontally.

To access the work piece from the pressure vessel, a horizontal motion is necessary to position one's self or a robot arm over the pressure vessel opening. Next, a vertical motion and a horizontal motion are necessary to remove the workpiece(s) from the pressure vessel. The steps are repeated in the reverse order to load the workpiece(s) into the pressure vessel. Each motion in the pressurization cycle reduces the efficiency thereof.

Isostatic presses are used in processes which require fluid and/or fluid and gas to be pressurized at pressures up to 150,000 psia. The processes are too numerous to name. Likewise, the workpieces treated in isostatic presses are too numerous to name.

Therefore, there is a need for an isostatic press which is highly efficient and which reduces the motion necessary to load and unload the workpieces from the pressure vessel.

SUMMARY OF THE INVENTION

An isostatic press is disclosed and comprises: a yoke; a bottom cover affixed to the yoke; a top cover affixed to the yoke; and, a generally cylindrical body moveable between a first position and a second position. Preferably, the yoke includes a tongue upon which the bottom cover is mounted. In the first position the generally cylindrical body rests on the yoke and extends vertically therefrom and resides circumferentially around the bottom portion of the bottom cover. However, the body does not cover or occlude the top surface of the bottom cover. The bottom cover resides atop a tongue of the yoke. The generally cylindrical body is driven upwardly from the first position to the second position where it abuts the top cover. In the second position, a chamber is formed by the bottom cover, the top cover and the body. The body is secured in place by the driving mechanism and by two latches which engage with a plate affixed to the body. The driving mechanism may be any type of linear actuator.

In the second position, the chamber is pressurized and the load is absorbed by the top cover, bottom cover and the cylindrical body. The body may be a perfect cylinder or it may have interior portions thereof having different diameters. End portions of the cylinder have a smaller inside diameter enabling more effective sealing of the pressure vessel when the body is in the second position. Further, a larger inside diameter in the intermediate portion of the vessel avoids wear and tear on the seals as the body is raised to the second position from the first position and vice-versa.

An isostatic press comprising a bottom cover, a top cover, and, a cylindrically shaped body having axially aligned centers is disclosed. The generally cylindrically shaped body is axially movable between first and second positions. When the cylindrically shaped body is axially moved to the second position, the inside wall of the cylindrical body engages the U-shaped seals which reside in circumferential recesses located about the top and bottom covers. Alternatively, conventional polymeric O-ring seals may be employed.

At least one process connection passageway exists in the top cover or in the bottom cover. Several passageways through the top and/or bottom cover may also be employed as desired by the user for the particular process employed. Since the top cover and the bottom cover are affixed to the yoke (sometimes referred to as the frame), the process connections do not have to be broken upon loading and unloading of the workpieces. This lowers the maintenance of the system and greatly increases the cycle frequency and efficiency.

A process for isostatically pressing a workpiece in an isostatic press having a yoke, a bottom cover supported by the yoke, a top cover supported by the yoke, and a body moveable between a first position and a second position, comprising the steps of: placing the workpiece on the bottom cover; moving the body from the first position to said second position; and, pressurizing the workpieces is disclosed. Further steps of depressurizing the workpieces and moving the body from the second position to the first position are necessary for completing the cycle. An additional step of removing the workpieces from the top of the bottom cover is necessary to unload the pressure vessel or pressure chamber.

Accordingly, it is an object of the invention to provide an isostatic press which minimizes the motion necessary for loading and unloading the workpieces to be pressurized.

Another object of the invention is to minimize the cycle time for pressurizing the workpieces. The cycle time may be defined as the amount of time measured from the time a workpiece is loaded into the press until the next workpiece is loaded into the press.

Another object of the invention is to provide an isostatic press which does not require process connections to be broken during unloading of the workpieces from the press.

Another object of the invention is to provide an isostatic press which has top and bottom covers fixed to the frame/yoke.

Another object of the invention is to provide an isostatic press having a body secured to the frame/yoke in the second, pressurized position.

Another object of the invention is to provide an isostatic press having a body which is driven by a linear actuator.

Another object of the invention is to provide an isostatic press which does not require flexible hose to be used to connect with the process connections. Flexible hose is not required because the process connections are affixed to passageways through the top and bottom covers which are stationary.

It is a further object of the invention to provide an isostatic press whose frame/yoke does not have to be retracted or moved in the course of loading and unloading workpieces from the pressure vessel.

It is a further object of the present invention to provide a surface upon which workpieces may be placed which is accessible from a large arc on both sides of the frame/yoke.

It is a further object of the present invention to provide an isostatic press which occupies very little floor space enabling ancillary robotic equipment and the like to be located in proximity thereto. Ancillary equipment may be robotic equipment and the like.

These and other objects of the invention will be better understood when reference is made to the Brief Description Of The Drawings, Description Of The Invention and claims which follow hereinbelow.

BRIEF DESCRIPTION OF THE DRAWINGS

FIG. 1 is a plan view of a prior art isostatic press utilizing a spacer plate.

FIG. 2 is a cross-sectional view of the prior art drawing of FIG. 1 illustrating use of the spacer plate.

FIG. 3 is a cross-sectional view of the prior art drawing of FIG. 1 illustrating the spacer plate in its removed position.

Figure 4:
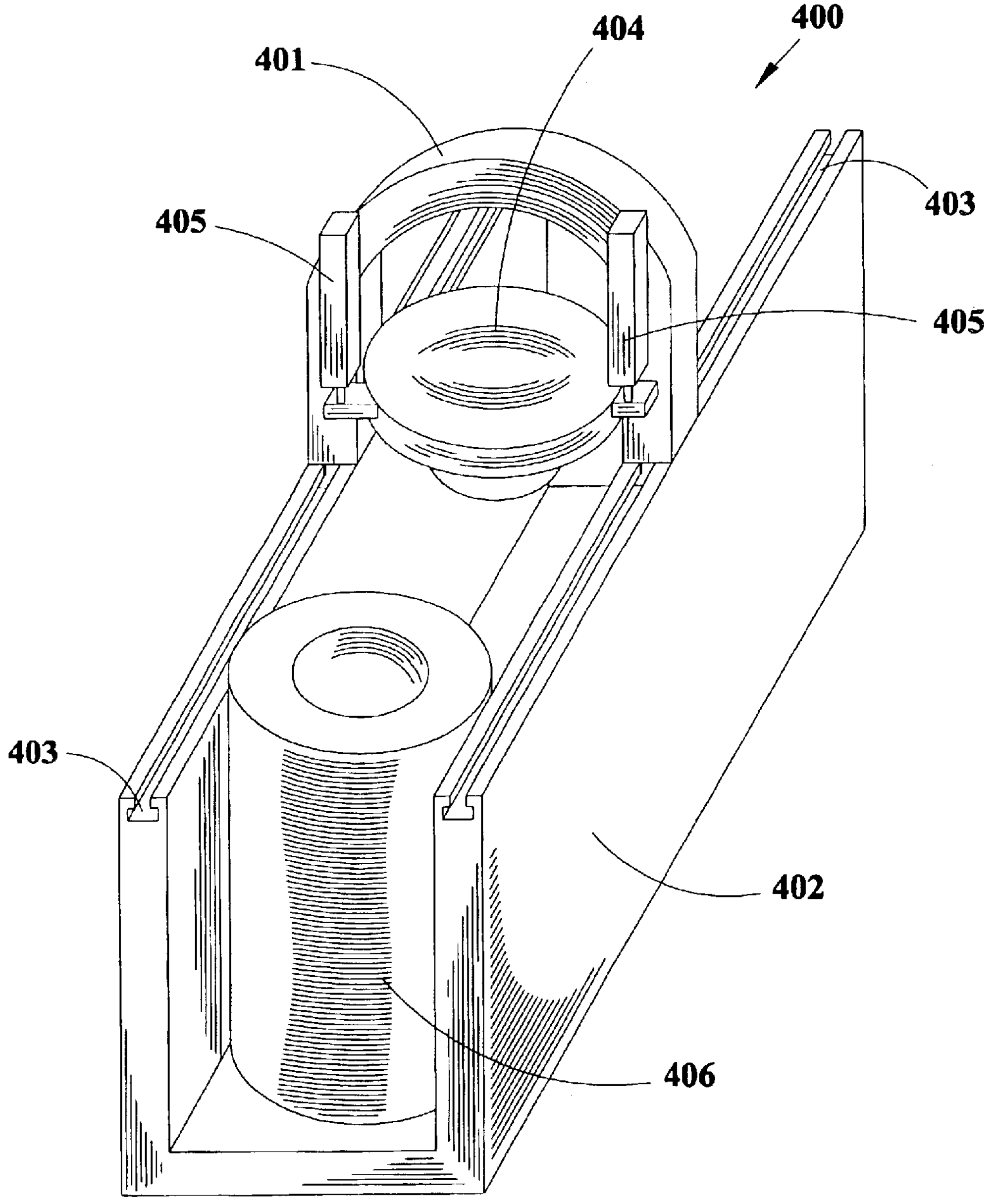
FIG. 4 is a schematic of a large prior art isostatic press illustrating the removal of the top cover from body.

The invention will be better understood when reference is made to the Description Of The Invention and claims which follow hereinbelow.

DESCRIPTION OF THE INVENTION

FIG. 1 is a copy of FIG. 1 of prior art U.S. Pat. No. 3,992,912 illustrating a plan view of an isostatic press utilizing a spacer plate. FIG. 2 is a copy of FIG. 2 of prior art U.S. Pat. No. 3,992,912 illustrating, in cross-section, use of the spacer to plate. FIG. 3 is a copy of FIG. 3 of prior art U.S. Pat. No. 3,992,912 illustrating, in cross-section, the spacer plate in its removed position.

The '912 patent to Jonsson discloses a frame 1 and a pressure vessel 2 within the frame. The pressure vessel 2 is moved horizontally every cycle and the lid 4 is moved substantially vertically by two cylinders 6, 7. See, FIG. 1. The press shown in FIGS. 1–3 comprises a frame stand 1 into which is introduced a cylindrical high-pressure vessel 2 provided with a bottom closure 3 and a top lid 4. A pressure fluid pipe 5 communicates with the top lid 4, which is vertically moveable by two double-acting cylinders 6, 7 disposed on each side of the frame. Spacer plate 8 is inserted into the frame 2 between the top lid 4 and the upper portion of the frame and is laterally displaceable along a track 9 as illustrated in FIGS. 2 and 3 which also illustrate the prior art. Spacer plate 8 is displaced by a hydraulic cylinder 10 actuating two lever arms 11, 12, respectively, the outer ends of which include pins 13 and 16, respectively.

Alternatively, according to the '912 patent to Jonsson, the top lid is fixed in relation to the upper yoke or frame and the pressure vessel is lifted toward the fixed top lid every cycle. In the alternative embodiment, the pressure vessel must be horizontally moved out of the frame each cycle for loading and unloading. Spacer plates are used in the alternative embodiment as well except they are placed underneath the pressure vessel and reside between the bottom closure of the vessel and the lower yoke of the frame.

FIG. 4 is a schematic 400 of a large prior art isostatic press illustrating the removal of the top cover 404 from body or pressure vessel 406. Rail 402 is generally U-shaped and forms the lower half of the yoke/frame. Slot 403 in rail 402 guides the upper yoke/frame 401 as it moves horizontally with respect to the pressure vessel. Means 405, such as a piston, vertically raise and lower the top cover 404 from the body 406. Upper yoke 401 is interlocked with lower yoke 402. The top cover is buttressed in the schematic of FIG. 4 such that when vessel 406 is pressurized the tensile forces applied to the top cover are transferred to the upper yoke/frame 401 and the lower yoke/frame 402.

Figure 5:
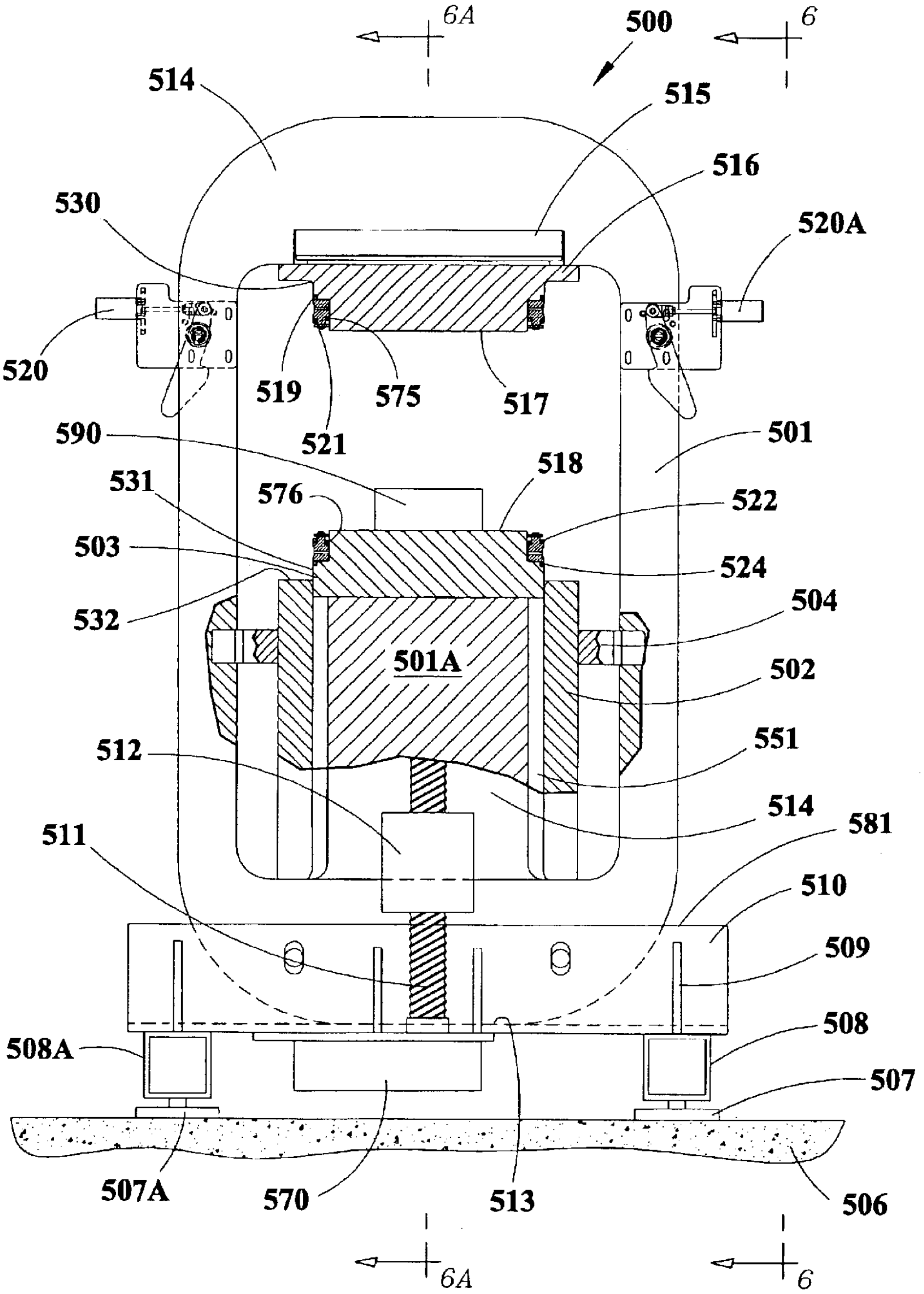
FIG. 5 is a partial cross-sectional view of the invention illustrating, among other things, the yoke cradle, the yoke, the bottom cover mounted on the tongue of the yoke, the moveable body resting on the yoke in its first position, and the top cover affixed to the yoke.

FIG. 5 is a partial cross-sectional view 500 of the invention illustrating, among other things, the yoke support cradle 510, the yoke 501, the bottom cover 503 mounted on the tongue 501A of the yoke 501, the moveable body 502, and the top cover 516 affixed to the upper portion 514 of the yoke 501 and to support bracket 515. Support brackets 515, 515A best viewed in FIG. 6A, are welded or bolted to the upper portion 514 of the yoke. The top cover 516 is preferably welded or bolted to the support brackets 515, 515 A.

Figure 7:
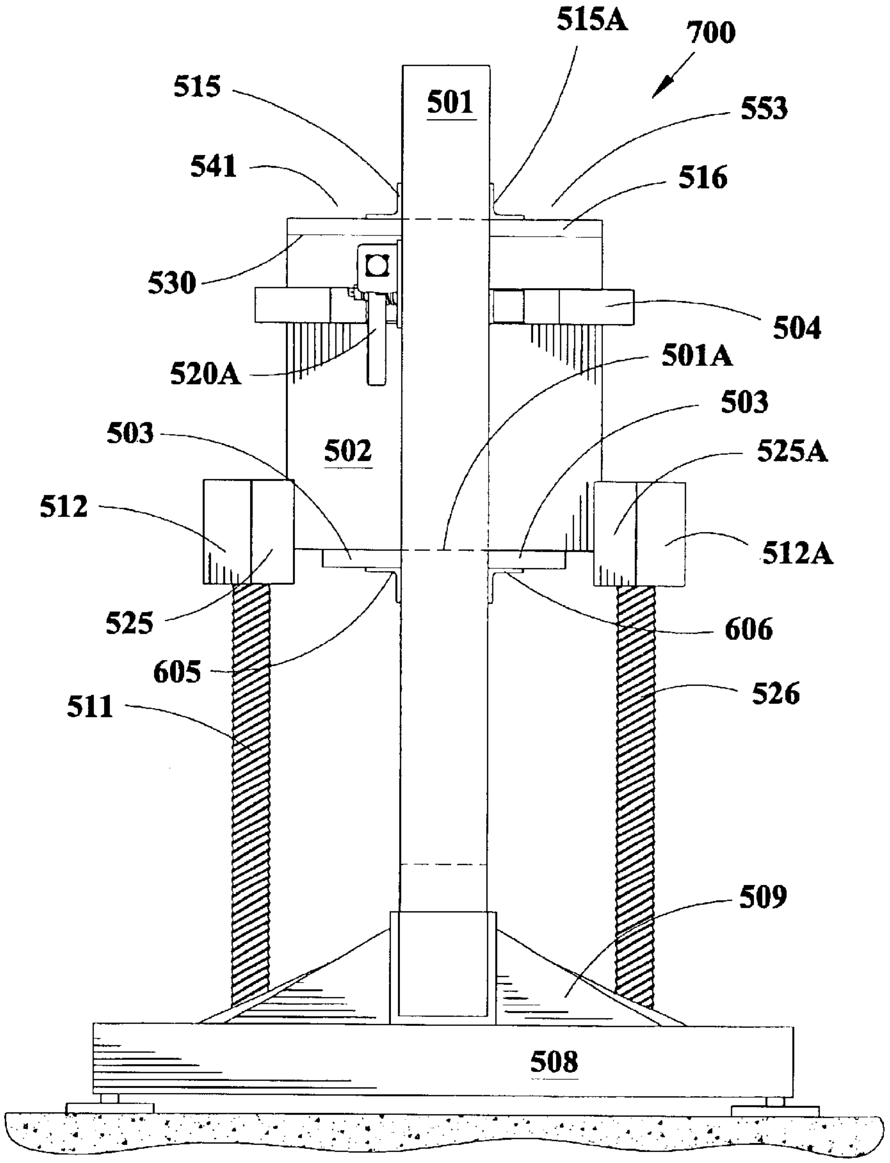
FIG. 7 is a right side view of the invention illustrating, among other things, the movable body in its second position.

The top cover 516 is generally cylindrically shaped and includes a shoulder 530 thereon. The top cover 516 is essentially a solid cylinder as is the bottom cover 503. The cylindrically shaped portion 531 resides within the cylindrically shaped body 502 when the body is in the second position as illustrated in FIG. 7. End 532 of the generally cylindrically-shaped body 502 abuts the shoulder 530 when body 502 is driven upwards to the second position as illustrated in FIG. 7.

Referring to FIG. 5, plate or flange 504 is affixed (preferably by welding) to body 502 and moves therewith such that it is redundantly secured in place by solenoid driven latches 520A, 520. Although latches 520A, 520 securely grip plate 504 as shown in FIG. 7, synchronous screw drives 512, 512A in combination with the portions 525, 525A of the screw drives affixed to the body 502 lock the body 502 in a particular vertical position. As a safety feature, however, pressurization of the body/pressure vessel 502 will not begin until and unless switches mounted on the safety latches 520A, 520 so permit.

Instead of the screw type drives 512, 512A, other drives may be used such as a rack and pinion drive. Further, the vessel could be magnetically driven upwardly and downwardly. This is not to be confused, however, with magnetically coupling the contents of the pressure vessel with a magnetic drive external to the pressure vessel.

Referring still to FIG. 5, channels 508, 508A are mounted atop adjustable foot supports 507, 507A which can be used to level the isostatic press. A yoke support cradle 510 is mounted transversely atop channels 508, 508A. The stationary yoke 501 is welded within the cradle. Reference numeral 513 is used to signify the bottom of the yoke support cradle 510 and the engagement of the yoke with the support cradle. Other methods of affixing the yoke to the cradle may be employed, for instance, the yoke may be bolted to the cradle. The foot supports rest upon the floor 506.

The structure and function of the various parts and members of the invention as disclosed herein may be employed on isostatic presses of any size, capacity or pressure rating. Further, various processes can be employed using the disclosed invention including, but not limited to hot isostatic and cold isostatic pressing or densification.

Referring again to FIG. 5, bottom cover 503 is generally cylindrically shaped. A workpiece or workpieces 590 may be placed on surface 518 of bottom cover 503. Bottom cover 503 is welded or bolted (not shown) to brackets 605, 606 which are also welded or bolted to the frame 501A. See FIG. 6A. When the body 502 is raised, the seals 522, 524, 576 of the bottom cover and the seals 519, 521, 575 of the top cover seal the chamber created within the body 502 and bounded by the face 518 of the bottom cover 503 and the face 517 of the top cover 516. The seals in the top and bottom covers may be polymeric O-rings rated for high pressure applications, Teflon coated U-shaped seals, or they may be metallic seals. The faces 517, 518 of the top and bottom covers, respectively, could be shaped differently as those skilled in the art will readily recognize so as to be customized for a particular workpiece configuration. For instance, surface 518 may be adapted to restrain or hold a particular workpiece.

Figure 6:
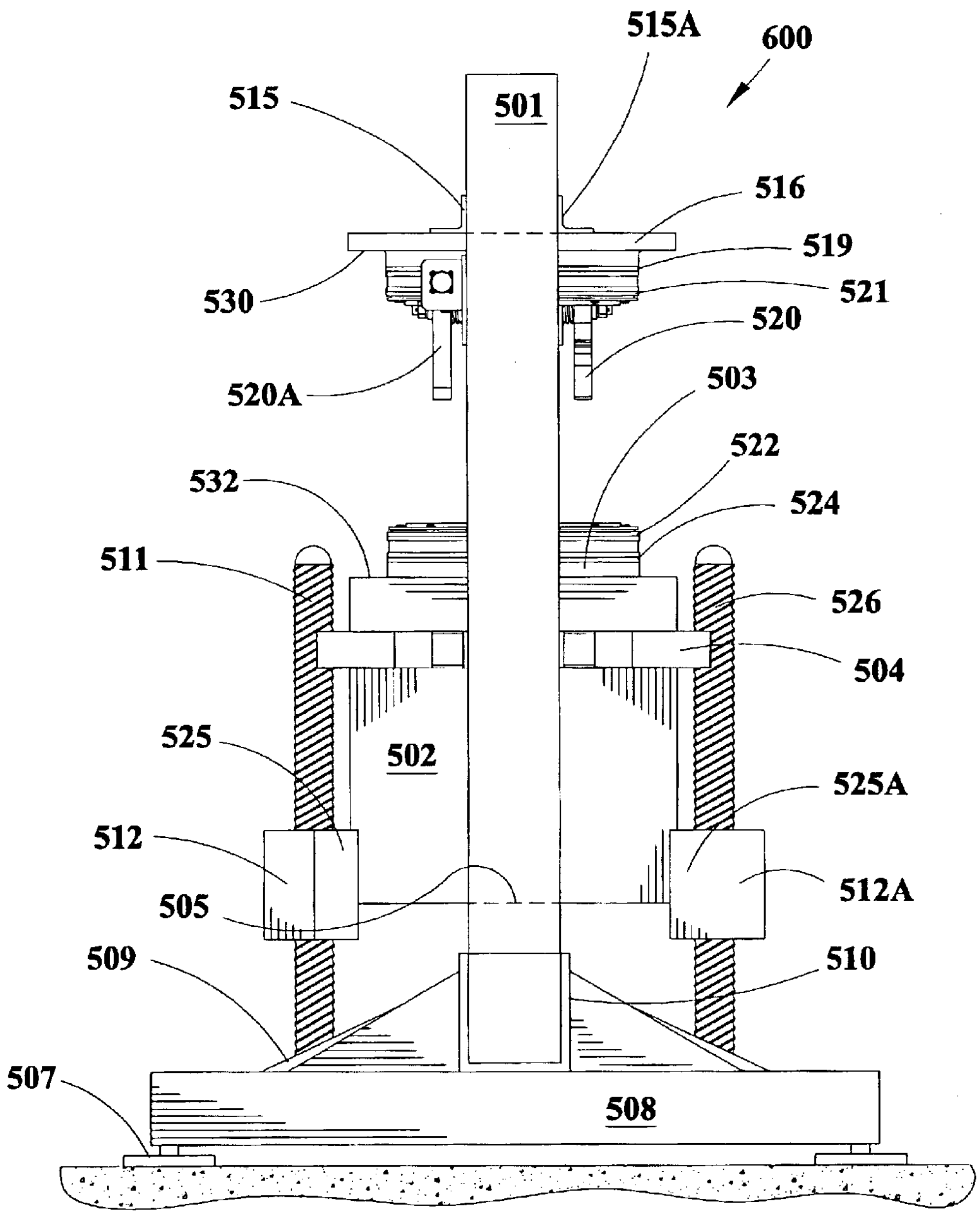
FIG. 6 is a right side view of the invention taken along the line 6—6 of FIG. 5 illustrating, among other things, the twin screw drive actuators, the movable body in its first position, a portion of the bottom cover and the top cover.
Figure 6A:
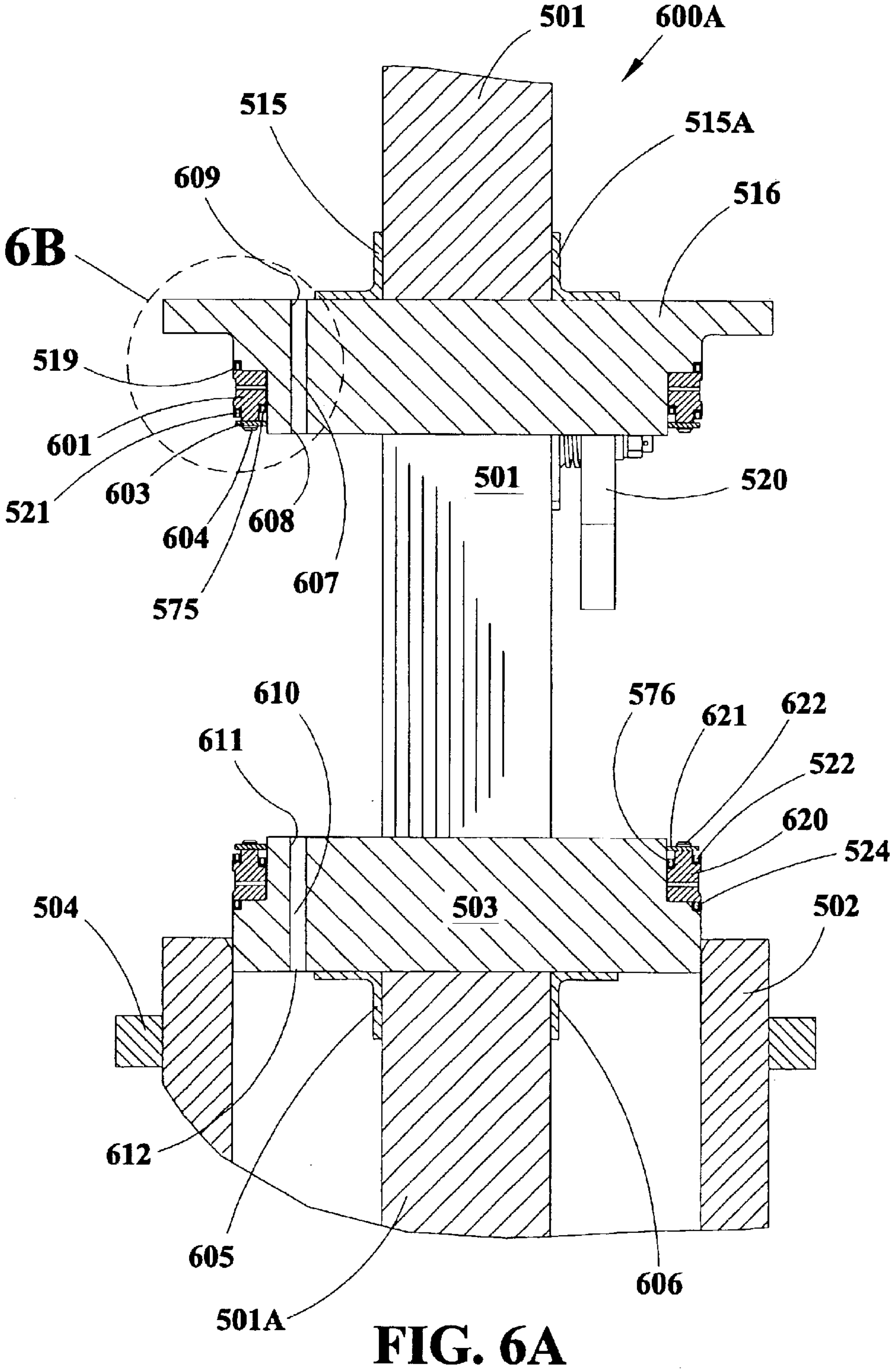
FIG. 6A is a cross-sectional view taken along the lines 6A—6A of FIG. 5.
Figure 6B:
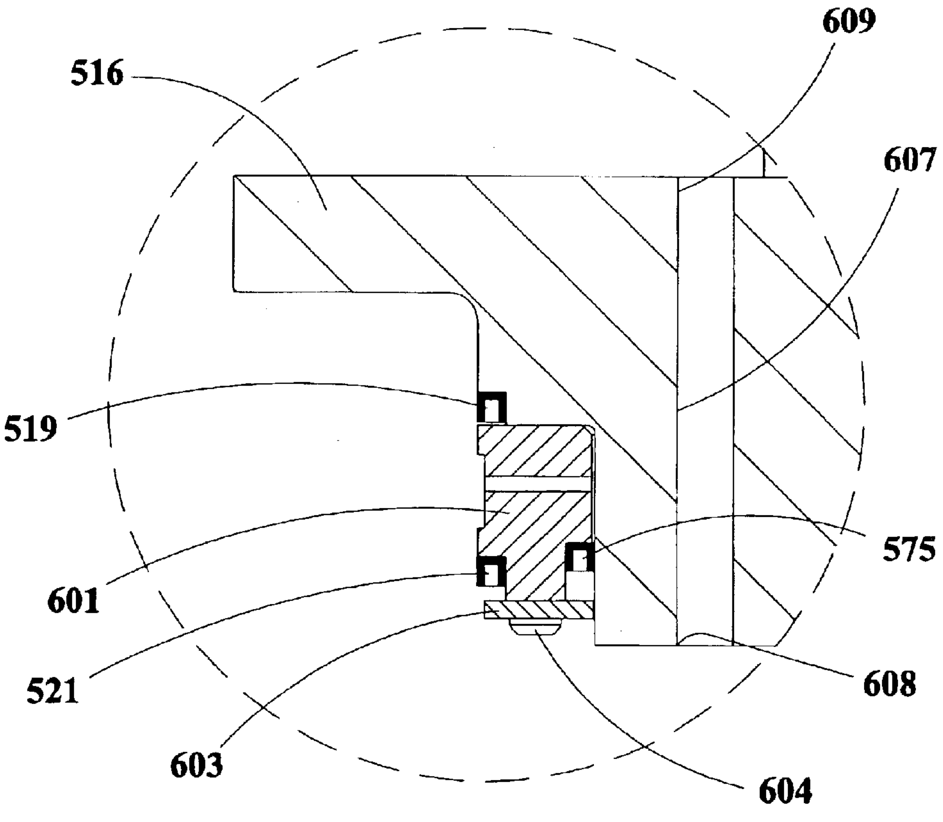
FIG. 6B is an enlargement of a portion of FIG. 6.

Referring to FIG. 6, top cover 516 may have passageways therethrough for communication with a pump or some other process equipment. Alternatively, no passageways may exist in the top cover 516 and a passageway(s) may exist in the bottom cover 503. Since, both the top 516 and the bottom 503 covers are fixed to the frame 501 and tongue 501A, respectively, process connections can be permanently made without breaking except for maintenance. This is one of the major advantages of this invention over the related art because the related art requires that: (1) the pressure vessel be removed from the frame; and/or (2) that the frame be moved away from the pressure vessel; and/or (3) that the top cover be moved vertically and/or horizontally with respect to the pressure vessel and away from it. Further, it is a major advantage of the present invention that top surface 518 of the bottom cover 503 be accessed from a wide angle or, put another way, from a wide arc from either side of the frame. Access to the surface 518 upon which workpieces may be placed is limited only by the frame.

Referring to FIG. 5, reference numeral 570 denotes, schematically, the synchronous drive system for screw gears 511 and 526. It is necessary to synchronously drive the gears 511, 526 to prevent misalignment of the body 502 as it is raised. Supports 509 ensure that the yoke support cradle 510 is stable.

The materials of construction of the frame 501, bottom cover 503, top cover 516 and body 502 may be made out of any machinable metal or metal alloy. The materials include, but are not limited to, Carbon Steel, Stainless Steel, Titanium, Hastelloy, Rene, Zirconium, Waspalloy and MP35N.

FIG. 6 is a right side view 600 of the invention illustrating, among other things, the twin screw gears 511, 526, the movable body 502 in its first position, the bottom cover 503 and the top cover 516. FIG. 6 provides a good illustration of the screw gears 511, 526. Further, FIG. 6 illustrates the angle irons 515, 51 5A which help to support the top cover 516. As previously stated, other linear drive mechanisms such as pistons, electric motors, rack and pinion gearing etc. may be used for raising and lowering the body 502. All of these methods are specifically contemplated by the instant invention.

FIG. 7 is a right side view 700 of the invention illustrating, among other things, the movable body 502 in its second position. Safety latch and permissive 520A is illustrated in its latched condition.

A process for isostatically pressing a workpiece 590 in an isostatic press is disclosed. The process employs a yoke 501, a bottom cover 503 supported by the yoke, a top cover 516 supported by the yoke, and a body 502 moveable between a first position (FIGS. 5 and 6) and a second position (FIG. 7). The top and bottom covers and the body, when in the second position form a pressure chamber. The process comprises the steps of: placing said workpiece on said bottom cover; moving said body from said first position to said second position; sealing the body with respect to the top and bottom covers; pressurizing the chamber; depressurizing the chamber; moving the body from the second position to the first position; and, removing the workpiece from the bottom cover.

FIG. 6A is a cross-sectional view 600A taken along the lines 6A—6A of FIG. 5. Top 516 and bottom 503 covers are illustrated in cross-section together with spacer plates 601 and 620, respectively. Spacer plate 601 is used to retain circumferentially extending seals 519, 521 and 575 and spacer plate 620 is used to retain circumferentially extending seals 524, 522 and 576. Each of the spacer plates 601 and 620 is affixed to the respective cover by screws or other means not shown. Spacer plates 601 and 620 extend circumferentially around their respective covers and retain the circumferentially extending seals 519, 524. Retaining rings 603 and 621 are affixed to the spacer plates 601, 620, respectively, by circumferentially oriented screws 604, 622. In the top cover, retaining ring 603 serves to retain seals 521 and 575. In the bottom cover, retaining ring 621 serves to retain seals 522 and 576. Still referring to FIG. 6A, passageway 607 is illustrated in top cover 516. End 609 of the passageway may be threaded or welded to a high pressure conduit which supplies a pressurized fluid or gas. Similarly, end 608 of passageway 607 communicates with the pressure chamber when body 502 is raised to its second position as shown in FIG. 7.

Passageway 610 in bottom cover 503 may be threaded or welded at end 612 to a high pressure conduit by a welded or threaded connection. End 611 of passageway communicates with the pressure chamber when body 502 is raised to its second position. Those skilled in the art will readily recognize that any passageway in either cover is in sealed communication with a pressure bearing conduit.

The number of passageways in the top and bottom cover is dependent on the user's requirements. At least one such passageway is necessary in either the top or bottom covers to pressurize the chamber formed when the body is in the second position as shown in FIG. 7. The conduit leading to the top and bottom covers is not shown in FIG. 7 or any of the other drawing Figures.

Figure 8:
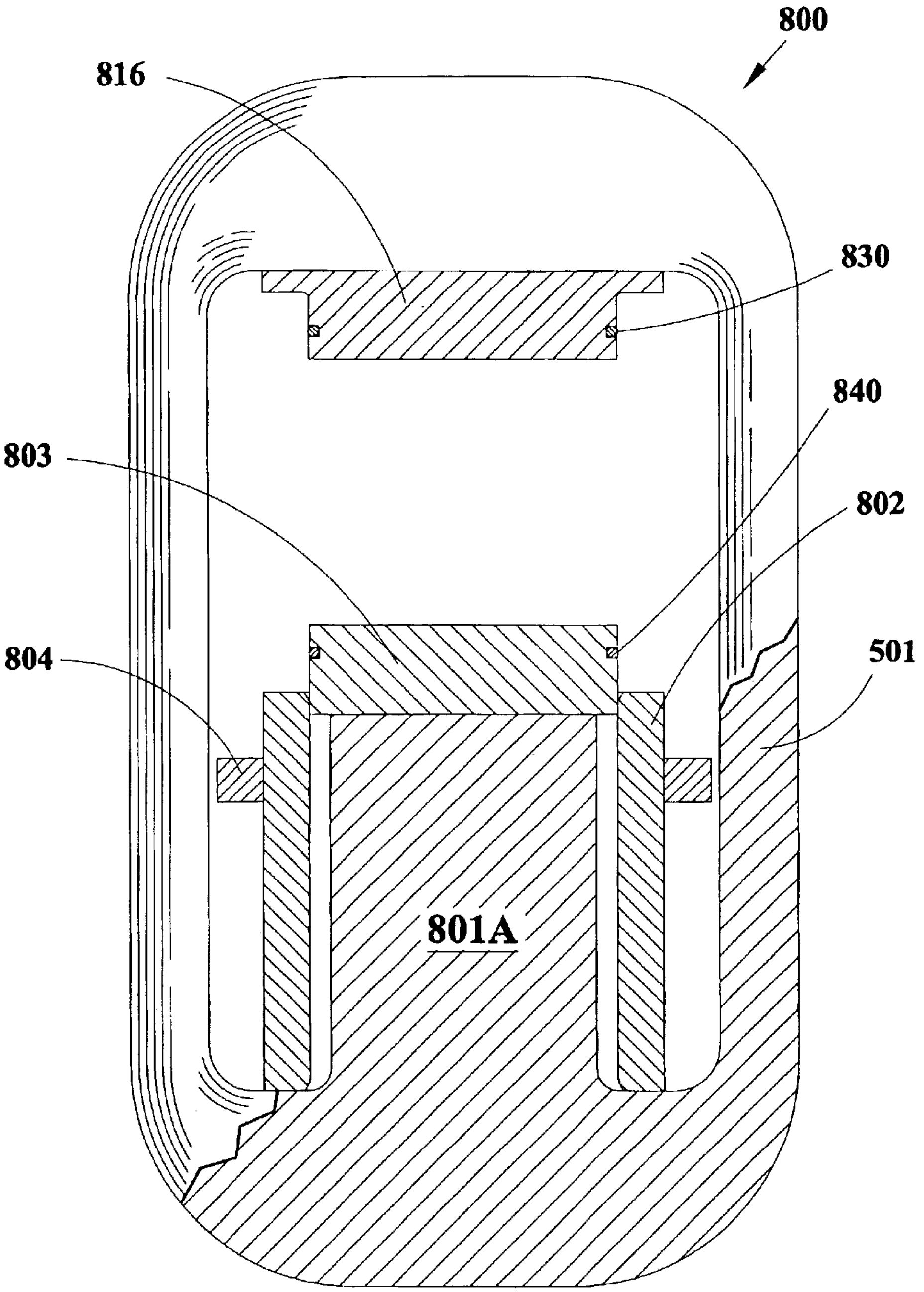
FIG. 8 is a cross-sectional diagrammatic illustration of the essential elements of the invention including the yoke mounted on the tongue, the body in the first position resting on the yoke, and the bottom and top cover.
Figure 9:
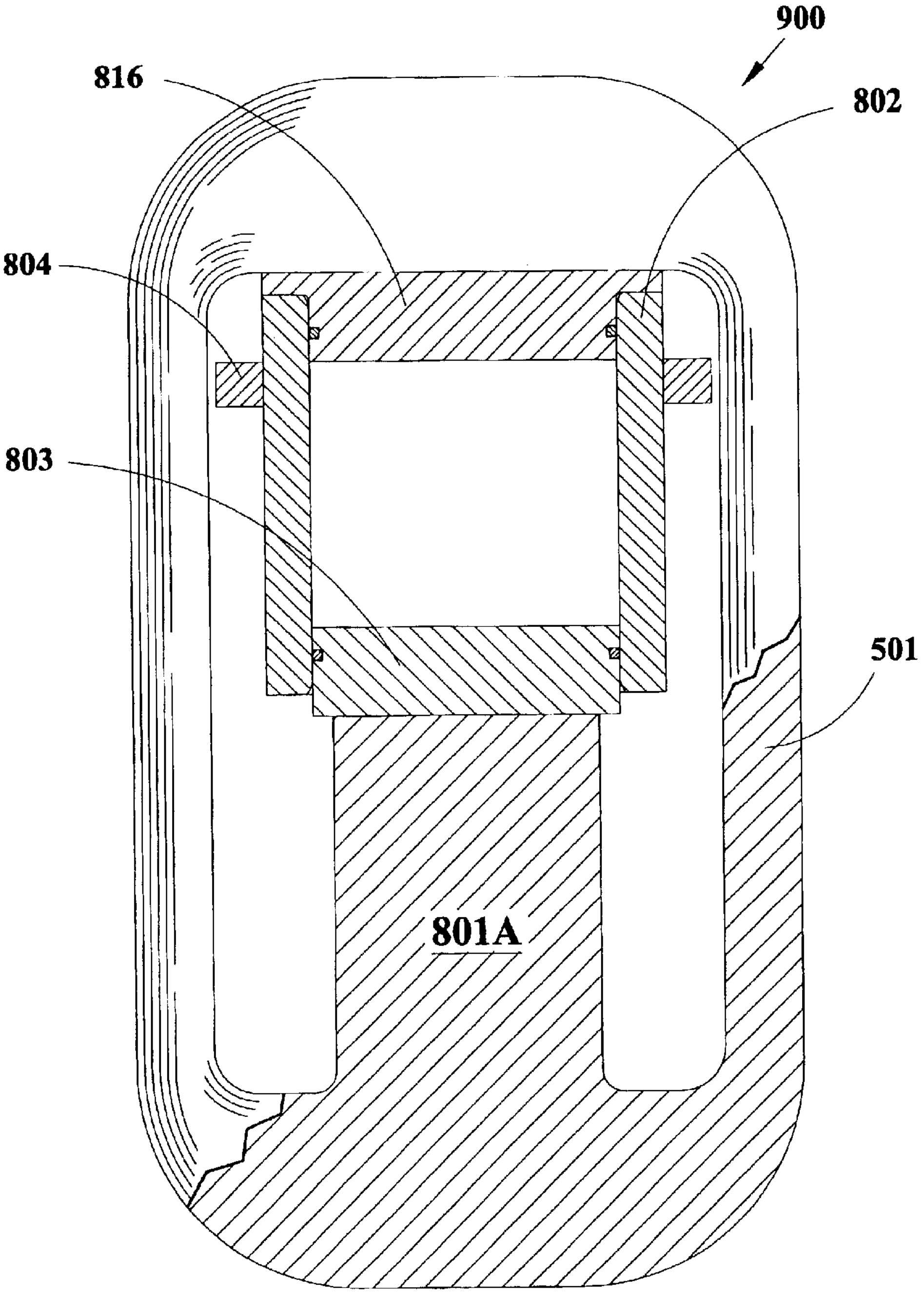
FIG. 9 is a cross-sectional view similar to that of FIG. 8 with the body in the second position.

FIG. 8 is a simplified diagrammatic illustration 800 in partial cross-section of the essential elements of the invention including the yoke having tongue 801A, the body 802 in the first position resting on the yoke, the top cover 816 and the bottom cover 803. Reference numeral 804 is a simple flange which can be used for interlocking the body in the second position. Latches which engage the flange in the second position are not shown in FIGS. 8 and 9. FIG. 8 does not illustrate the linear drive mechanism for moving the body 802 from the first to the second position and vice versa. FIG. 8 illustrates the bottom cover 803 atop the tongue 801A. Seals 840, 830 which can be polymeric O-ring seals are shown in the bottom and top covers 803 and 816, respectively. The geometry of the seals and the structure to retain them in FIGS. 5, 6, 6A and 7 is optional and a simplified seal arrangement 830, 840 in the top and bottom covers 816, 803 as shown in FIG. 8 may be used. Other seal arrangements may be used and may take many different forms. Any high pressure seal may be used. FIGS. 8 and 9 illustrate a simple O-ring seal in a recess.

Figure 8A:
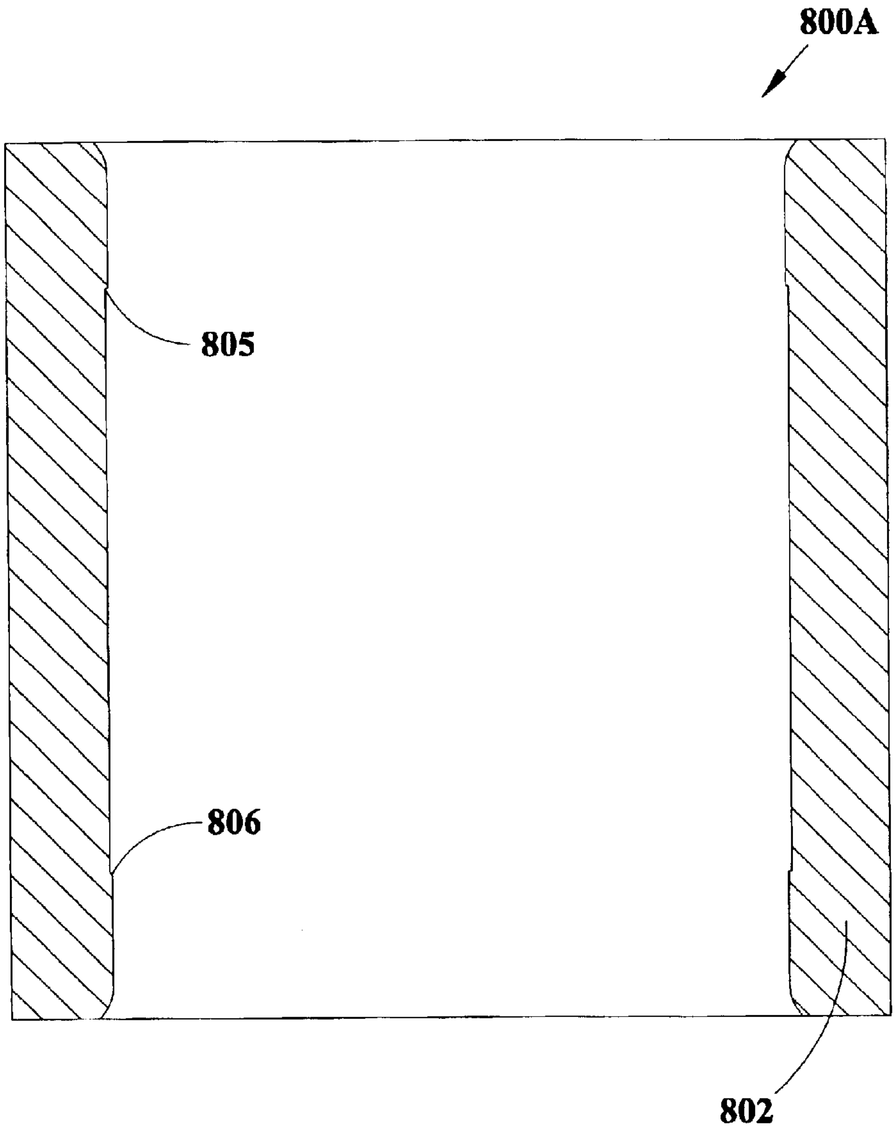
FIG. 8A is a cross-sectional view of the body illustrating end portions having interior diameters which are smaller than the interior of an intermediate portion.

FIG. 8A is a cross-sectional view 800A of the body 802 illustrating end portions 805, 806 having interior diameters which are smaller than the interior of an intermediate portion. The smaller diameters provide for better sealing when the body is in the second position and the intermediate portion having a larger interior diameter eliminates excessive wear and tear on the seals as the body is moved between first and second positions during each cycle.

FIG. 9 is a cross-sectional view 900 similar to that of FIG. 8 with the body 802 in the second position which forms a pressure chamber (unnumbered).

The isostatic press described herein may be manufactured and used in many different sizes, capacities, dimensions and geometries without departing from the spirit and scope of the teachings within and without departing from the spirit and the scope of the appended claims. Further, changes to the invention such as the elimination of the tongue 801A/501A may occur without departing from the spirit and scope of the claims which follow hereinbelow. For instance, if the tongue 801A/501A is eliminated then an elongated bottom cover may sit directly on the bottom of the yoke such that it protrudes above the body. Use of an elongated body would enable access to the top of the bottom cover in the same way that placement and affixation of the bottom cover atop the tongue does.

The invention has been described by way of example only and those skilled in the art will readily understand that certain changes may be made to the invention as shown and described herein without departing from the spirit and scope of the claims which follow hereinbelow.

I claim:

1. An isostatic press comprising: a yoke; said yoke includes a tongue; a bottom cover affixed to said tongue; a top cover affixed to said yoke;

and, a body moveable between a first position and a second position.

2. An isostatic press as claimed in claim 1 wherein said body is driven between said first and second position by a screw drive actuator.

3. An isostatic press as claimed in claim 1 wherein said body is driven between said first position and said second position by a piston.

4. An isostatic press as claimed in claim 1 wherein said body is driven between said first position and said second position by a rack and pinion actuator.

5. An isostatic press as claimed in claim 1 wherein said body is driven between said first position and said second position by a linear actuator.

6. An isostatic press as claimed in claim 1 wherein said top and bottom covers each include at least one seal.

7. An isostatic press as claimed in claim 1 wherein said body is concentric with said bottom cover and said top cover.

8. An isostatic press as claimed in claim 7 wherein said body abuts said yoke in said first position and abuts said top cover in said second position.

9. An isostatic press as claimed in claim 1 further comprising a plate affixed to said body and moveable therewith.

10. An isostatic press as claimed in claim 9 further comprising at least one latch affixed to said yoke, said latch engaging and restraining said plate and said body affixed thereto when said body is in said second position.

11. An isostatic press as claimed in claim 1 wherein said bottom cover includes a circumferential seal and said top cover includes a circumferential seal such that said seals engage said body when said body is in said second position.

12. An isostatic press as claimed in claim 1 further comprising at least one passageway through said top cover.

13. An isostatic press as claimed in claim 1 further comprising at least one passageway through said bottom cover.

14. An isostatic press as claimed in claim 1 further comprising at least one passageway through said top cover and one passageway through said bottom cover.

15. An isostatic press as claimed in claim 10 wherein said latch is solenoid operated.

16. An isostatic press comprising: a frame which includes a tongue; a bottom cover affixed to said tongue; a top cover; and, a cylindrically shaped body; each of said bottom cover, top cover, and cylindrically shaped body having axially aligned centers, and, said cylindrically shaped body axially movable between a first position and a second position.

17. An isostatic press as claimed in claim 16 wherein said top cover is affixed to said yoke.

18. An isostatic press as claimed in claim 16 wherein said cylindrically shaped body has an interior having at least two diameters.

19. An isostatic press as claimed in claim 18 wherein said top cover and said bottom cover have generally cylindrically shaped portions which are coupled with said cylindrically shaped body when said body is in said second position.

20. A process for isostatically pressing a workpiece in an isostatic press having a yoke, said yoke includes a tongue, a bottom cover supported by said tongue of said yoke, a top cover supported by said yoke, and a body moveable between a first position and a second position, said top and bottom covers and said body when in said second position form a pressure chamber, comprising the steps of: placing said workpiece on said bottom cover; moving said body from said first position to said second position; and, pressurizing said chamber.

21. A process for isostatically pressing a workpiece as claimed in claim 20, further comprising the step of: sealing said body with respect to said top and bottom covers.

22. A process for isostatically pressing a workpiece as claimed in claim 21, further comprising the steps of: depressurizing said chamber; moving said body from said second position to said first position; and, removing said workpiece from said bottom cover.

23. An isostatic press for pressurizing multiple workpieces, comprising: a yoke; said yoke includes a tongue; a bottom cover affixed to said tongue; a top cover affixed to said yoke; a generally cylindrical body moveable between a first position and a second position; said body in said first position not occluding said bottom cover enabling placement of multiple workpieces thereon from wide arcs; and, said body in said second position and said top and bottom covers forming a chamber for the pressurization of said workpieces.

* * * * *